United States Patent
Shniberg et al.

(10) Patent No.: US 7,262,792 B2
(45) Date of Patent: Aug. 28, 2007

(54) SYSTEM AND METHODOLOGY FOR TRACKING OBJECTS USING VISUALLY SENSIBLE INDICATORS

(75) Inventors: Moti Shniberg, Elkannah (IL); Yaron Nemet, Kedumim (IL); Erez Sali, Savion (IL)

(73) Assignee: ImageID, Hod Hasharon (IL)

( * ) Notice: Subject to any disclaimer, the term of this patent is extended or adjusted under 35 U.S.C. 154(b) by 0 days.

(21) Appl. No.: 10/501,776

(22) PCT Filed: Jan. 16, 2003

(86) PCT No.: PCT/IL03/00045

§ 371 (c)(1),
(2), (4) Date: Mar. 15, 2005

(87) PCT Pub. No.: WO03/060626

PCT Pub. Date: Jul. 24, 2003

(65) Prior Publication Data

US 2005/0162274 A1    Jul. 28, 2005

(51) Int. Cl.
*H04N 5/225*    (2006.01)

(52) U.S. Cl. .............. 348/169; 235/385; 235/469; 235/494; 340/5.92; 340/586; 340/602; 340/689; 340/691.6

(58) Field of Classification Search .......... 348/169; 340/5.92, 572.1, 572.4, 521, 522, 573.1, 340/691.6, 586, 601, 602, 689, 5.8, 825.49, 340/870.16, 870.17, 588, 870; 283/74, 81; 235/435, 487, 494, 462.11, 462.04, 462.41, 235/462, 385, 469; 705/22, 28
See application file for complete search history.

(56) References Cited

U.S. PATENT DOCUMENTS

| | | | |
|---|---|---|---|
| 3,636,317 A | 1/1972 | Torrey | |
| 3,646,624 A | 3/1972 | Waugh | |
| 3,959,629 A | 5/1976 | Specht et al. | |
| 4,044,227 A | 8/1977 | Holm et al. | |
| 4,268,179 A | 5/1981 | Long et al. | |
| 4,345,274 A | 8/1982 | Bambara | |
| 4,794,238 A | 12/1988 | Hampton | |
| 4,844,509 A | 7/1989 | Kasprzak et al. | |
| 4,858,000 A | 8/1989 | Lu | |
| 4,924,088 A | 5/1990 | Carman et al. | |
| 5,113,349 A | 5/1992 | Nakamura et al. | |
| 5,153,842 A * | 10/1992 | Dlugos et al. | 235/380 |
| 5,468,949 A | 11/1995 | Swart et al. | |
| 5,539,394 A | 7/1996 | Cato et al. | |
| 5,565,858 A | 10/1996 | Guthrie | |
| 5,587,906 A | 12/1996 | Melver et al. | |
| 5,600,121 A | 2/1997 | Kahn et al. | |
| 5,621,864 A | 4/1997 | Benade et al. | |
| 5,635,403 A * | 6/1997 | Bailey | 422/58 |

(Continued)

FOREIGN PATENT DOCUMENTS

WO    WO 00/04711    1/2000

*Primary Examiner*—Thomas Mullen
(74) *Attorney, Agent, or Firm*—Goodwin Procter LLP

(57) ABSTRACT

A system for tracking objects including visually sensible indicators on objects being tracked, at least one imager capturing images of the objects being tracked which images also show the visually sensible indicators and at least one image processor receiving outputs of the at least one imager and extracting from the outputs coded information indicated by the visually sensible indicators.

38 Claims, 13 Drawing Sheets

U.S. PATENT DOCUMENTS

| | | | |
|---|---|---|---|
| 5,698,833 A * | 12/1997 | Skinger | 235/462.11 |
| 5,708,470 A | 1/1998 | Holford | |
| 5,780,826 A | 7/1998 | Hareyama et al. | |
| 5,825,012 A | 10/1998 | Rockstein et al. | |
| 5,828,048 A | 10/1998 | Rockstein et al. | |
| 5,828,049 A | 10/1998 | Knowles et al. | |
| 5,914,477 A | 6/1999 | Wang | |
| 5,963,134 A | 10/1999 | Bowers et al. | |
| 5,988,508 A | 11/1999 | Bridgleall et al. | |
| 5,996,895 A | 12/1999 | Himan et al. | |
| 6,023,530 A | 2/2000 | Wilson | |
| 6,032,861 A * | 3/2000 | Lemelson et al. | 235/494 |
| 6,070,801 A | 6/2000 | Watanabe et al. | |
| 6,076,023 A | 6/2000 | Sato | |
| 6,088,482 A | 7/2000 | He et al. | |
| 6,127,928 A | 10/2000 | Issacman et al. | |
| 6,142,375 A * | 11/2000 | Belka et al. | 235/454 |
| 6,164,541 A | 12/2000 | Dougherty et al. | |
| 6,206,286 B1 | 3/2001 | Watanabe et al. | |
| 6,252,508 B1 | 6/2001 | Vega et al. | |
| 6,259,408 B1 | 7/2001 | Brady et al. | |
| 6,265,977 B1 | 7/2001 | Vega et al. | |
| 6,283,375 B1 | 9/2001 | Wilz, Sr. et al. | |
| 6,285,342 B1 | 9/2001 | Brady et al. | |
| 6,286,763 B1 * | 9/2001 | Reynolds et al. | 235/472.01 |
| 6,294,997 B1 * | 9/2001 | Paratore et al. | 340/572.1 |
| 6,317,044 B1 | 11/2001 | Maloney | |
| 6,342,830 B1 * | 1/2002 | Want et al. | 340/572.7 |
| 6,418,235 B1 | 7/2002 | Morimoto et al. | |
| 6,496,806 B1 | 12/2002 | Horowitz et al. | |
| 6,526,158 B1 | 2/2003 | Goldberg | |
| 6,531,675 B2 | 3/2003 | Faitel | |
| 6,563,417 B1 * | 5/2003 | Shaw | 340/572.1 |
| 6,600,418 B2 | 7/2003 | Francis et al. | |
| 6,685,094 B2 * | 2/2004 | Cameron | 235/462.01 |
| 6,787,108 B2 * | 9/2004 | Ribi | 422/58 |
| 6,801,245 B2 | 10/2004 | Shniberg et al. | |
| 6,830,181 B1 * | 12/2004 | Bennett | 235/462.01 |
| 2003/0118216 A1 | 6/2003 | Goldberg | |
| 2003/0160096 A1 * | 8/2003 | Morimoto | 235/375 |
| 2004/0046643 A1 * | 3/2004 | Becker et al. | 340/10.41 |

* cited by examiner

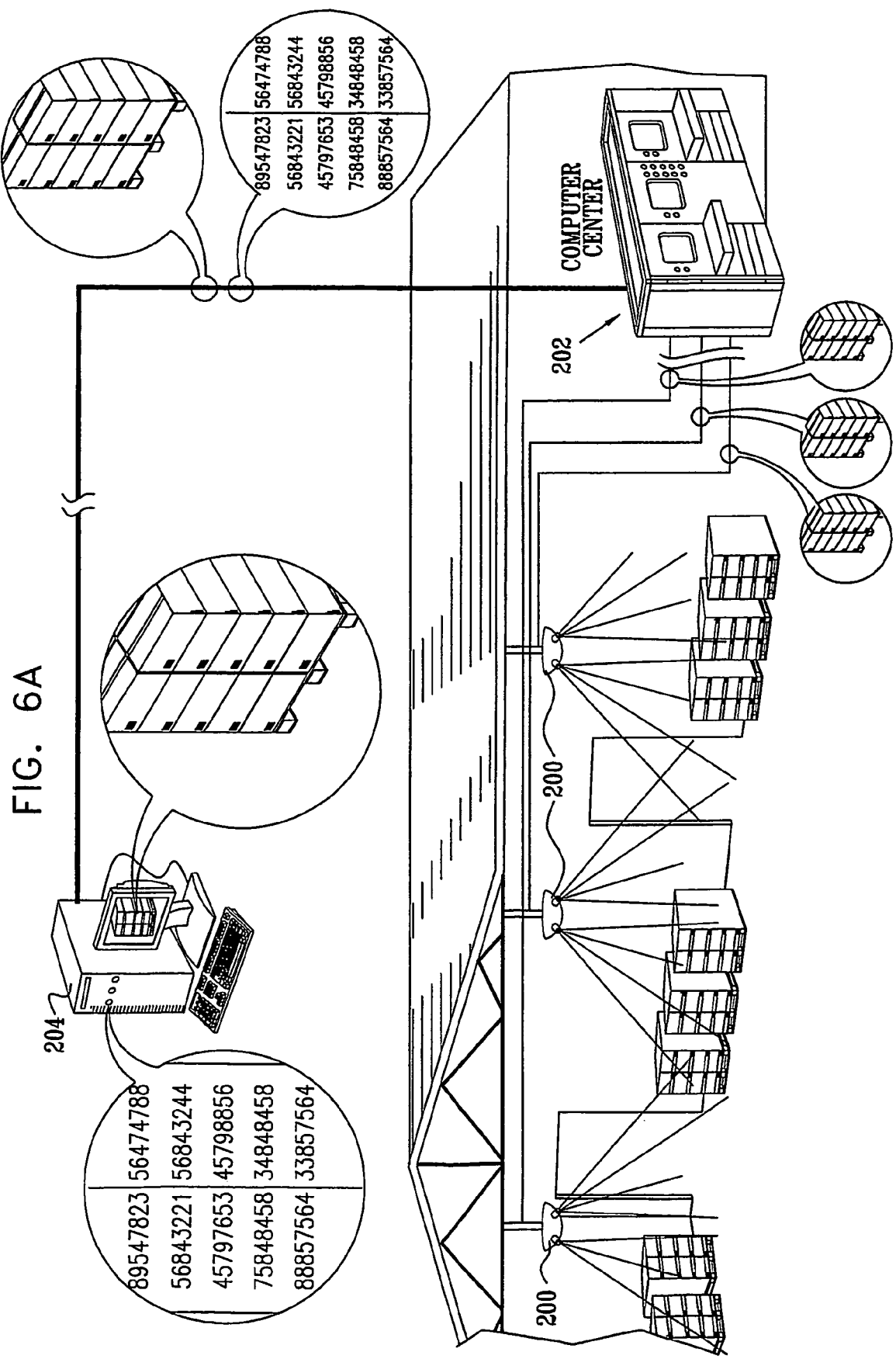

SYSTEM AND METHODOLOGY FOR TRACKING OBJECTS USING VISUALLY SENSIBLE INDICATORS

REFERENCE TO RELATED APPLICATIONS

This application is a national phase filing of PCT Application Serial No. IL03/00045, filed Jan. 16, 2003, which claims priority from U.S. patent application Ser. No. 10/052,427, filed Jan. 18, 2002, now issued as U.S. Pat. No. 6,801,245, entitled "METHOD FOR AUTOMATIC IDENTIFICATION AND CAPTURE".

FIELD OF THE INVENTION

The present invention relates to logistics systems and methods generally and more particularly to systems and methods for tracking objects.

BACKGROUND OF THE INVENTION

Various systems and techniques are known for tracking the location of objects. These involve the use of bar-codes and other optically sensible codes.

The following U.S. patents and Published PCT Applications are believed to represent the current state of the art:

U.S. Pat. Nos. 6,460,769; 6,456,239; 6,445,810; 6,442,476; 6,433,732; 6,427,913; 6,424,260; 6,405,924; 6,400,830; 6,384,409; 6,381,509; 6,339,745; 6,317,044; 6,286,763; 6,265,977; 6,285,342; 6,283,375; 6,259,408; 6,252,508; 6,206,286; 6,127,928; 6,070,801; 6,098,877; 6,027,022; 5,996,895; 5,988,508; 5,912,980; 5,828,049; 5,828,048; 5,825,012; 5,646,389; 5,621,864; 5,600,121; 5,528,228; 5,468,949; 5,384,859; 5,224,373; 4,924,799; 4,844,509; 4,794,238; 4,636,950; 4,340,810; 4,340,008; 4,268,179; 4,044,227 and 3,961,323.

Published PCT Applications WO 00/04711 and WO 98/10358.

The disclosures of the foregoing U.S. patents and Published PCT Applications are hereby incorporated by reference.

SUMMARY OF THE INVENTION

The present invention seeks to provide highly efficient and cost effective systems and methodologies for tracking objects.

There is thus provided in accordance with a preferred embodiment of the present invention a methodology for tracking objects including affixing at least one imagable identifier onto each of a multiplicity of objects to be tracked, imaging at least a portion of at least one of the multiplicity of objects at a known location to provide an at least partial image of the at least one of the multiplicity of objects, containing the at least one imagable identifier and employing the at least partial image of the object containing the at least one imagable identifier to provide an output indication of the location of the at least one of the multiplicity of objects.

There is also provided in accordance with another preferred embodiment of the present invention an object tracking system including at least one imagable identifier affixed onto each of a multiplicity of objects to be tracked, an imager, imaging at least a portion of at least one of the multiplicity of objects at a known location to provide an at least partial image of the at least one of the multiplicity of objects, containing the at least one imagable identifier and a processor employing the at least partial image of the object containing the at least one imagable identifier to provide an output indication of the location of the at least one of the multiplicity of objects.

Preferably, the methodology also includes communicating at least one of the at least partial image and the output indication to a remote location.

Affixing preferably includes adhesively attaching the at least one imagable identifier onto a surface of each of the multiplicity of objects. Alternatively or additionally, affixing includes molding the at least one imagable identifier onto a surface of each of the multiplicity of objects. Alternatively or additionally, affixing includes printing the at least one imagable identifier onto a surface of each of the multiplicity of objects.

In accordance with a preferred embodiment of the present invention, the at least one imagable identifier includes a multi-color identifier. Preferably, the at least one imagable identifier includes a multi-segment, multi-color identifier.

In accordance with a preferred embodiment of the present invention, the multi-segment, multi-color identifier is capable of identifying and distinguishing a plurality of objects at least equal to approximately:

$$\text{Plurality of objects} = (n \times (n-1)^{(p-2)} \times (n-2))/p$$

where n is the number of different colors and p is the number of segments.

More preferably, the multi-segment, multi-color identifier is capable of identifying and distinguishing a plurality of objects at least equal to approximately:

$$\text{Plurality of objects} = n \times (n-1)^{(p-2)} \times (n-2)$$

where n is the number of different colors and p is the number of segments.

In accordance with a preferred embodiment of the present invention, the multi-segment, multi-color identifier has an inherent orientation.

Preferably, imaging includes photographing and may include imaging a plurality of the objects together within a single image. Additionally or alternatively, imaging may include sequentially imaging a plurality of the objects passing a given imaging location.

Preferably, the at least one imagable identifier includes a plurality of imagable identifiers arranged in at least predetermined propinquity to each other.

In accordance with another preferred embodiment of the present invention, employing the at least partial image of the object containing the at least one imagable identifier includes extracting an identification code from the at least partial image.

Preferably, the object tracking system also includes a communicator, communicating at least one of the at least partial image and the output indication to a remote location.

In accordance with still another preferred embodiment of the present invention, the processor is operative to extract an identification code from the at least partial image.

Preferably, output from the imager of the object tracking system, as well as output from the imaging of the methodology, can be stored for future retrieval.

There is further provided in accordance with a preferred embodiment of the present invention a system for tracking objects including visually sensible indicators on objects being tracked, at least one imager capturing images of the objects being tracked which images also show the visually sensible indicators and at least one image processor receiving outputs of the at least one imager and extracting from the outputs coded information indicated by the visually sensible indicators.

There is still further provided in accordance with yet another preferred embodiment of the present invention a system for monitoring objects including a plurality of sensors associated with objects being monitored, visually sensible indicators associated with each of the objects, receiving sensor outputs of the plurality of sensors and providing visually sensible indications of the sensor outputs, at least one imager capturing images of the visually sensible indicators and at least one image processor receiving image outputs of the at least one imager and extracting from the image outputs coded information indicated by the visually sensible indicators.

In accordance with another preferred embodiment of the present invention, the at least one monitor is remotely located from the objects being monitored.

In accordance with yet another preferred embodiment of the present invention the system also includes at least one monitor receiving and displaying the coded information from the image processor. Alternatively, the at least one monitor is also operative to display the images of the objects in conjunction with the coded information.

Preferably, the visually sensible indicator indicates object identity information. Alternatively or additionally, the visually sensible indicator also indicates at least one additional parameter relating to the object.

In accordance with another preferred embodiment of the present invention the visually sensible indicator is a dynamic indicator. Additionally, the visually sensible indicator provides non-alphanumeric indications of multiple parameters relating to an object onto which the indicator is mounted. Alternatively or additionally, the visually sensible indicator provides a coded indication of at least two of the following parameters: object location, object identity, object maximum temperature history, object maximum humidity history, object minimum temperature history, object minimum humidity history, object tilt history, and object G-force history.

In accordance with another preferred embodiment of the present invention the at least one imager includes a plurality of imagers, which plurality is greater than the number of the at least one image processor.

Preferably, the at least one imager includes at least one scanning imager.

There is still further provided in accordance with yet another preferred embodiment of the present invention a method for tracking objects including associating visually sensible indicators with objects being tracked, capturing images of the objects being tracked which images also show the visually sensible indicators and image processing outputs of the at least one imager and extracting from the outputs coded information indicated by the visually sensible indicators.

There is also provided in accordance with still another preferred embodiment of the present invention a method for monitoring objects including associating a plurality of sensors with objects being monitored, associating visually sensible indicators with each of the objects, providing to the visually sensible indicators, sensor outputs of the plurality of sensors, operating the visually sensible indicators to provide visually sensible indications of the sensor outputs, employing at least one imager to capture images of the visually sensible indicators and employing at least one image processor to receive image outputs of the at least one imager and extract from the image outputs coded information indicated by the visually sensible indicators.

In accordance with another preferred embodiment of the present invention the method for tracking objects also includes remotely receiving and displaying the coded information from the image processor. Additionally or alternatively, the method also includes displaying the images of the objects in conjunction with the coded information.

Preferably, the visually sensible indicator indicates object identity information. Additionally, the visually sensible indicator also indicates at least one additional parameter relating to the object.

In accordance with yet another preferred embodiment the visually sensible indicator changes its visual display in real time in accordance with the parameters indicated thereby. Additionally, the visually sensible indicator provides non-alphanumeric indications of multiple parameters relating to an object onto which the indicator is mounted. Alternatively or additionally, the visually sensible indicator provides a coded indication of at least two of the following parameters: object location, object identity, object maximum temperature history, object maximum humidity history, object minimum temperature history, object minimum humidity history, object tilt history, and object G-force history.

In accordance with still another preferred embodiment of the present invention the image processor processes images captured at plural locations.

Preferably, the capturing images employs at least one scanning imager.

BRIEF DESCRIPTION OF THE DRAWINGS

The present invention will be understood and appreciated more fully from the following detailed description in which:

FIGS. 6A, 6B, 6C and 6D are simplified pictorial illustrations of four features which are preferably included in the system of FIG. 5;

DETAILED DESCRIPTION OF PREFERRED EMBODIMENTS

Figure 1:
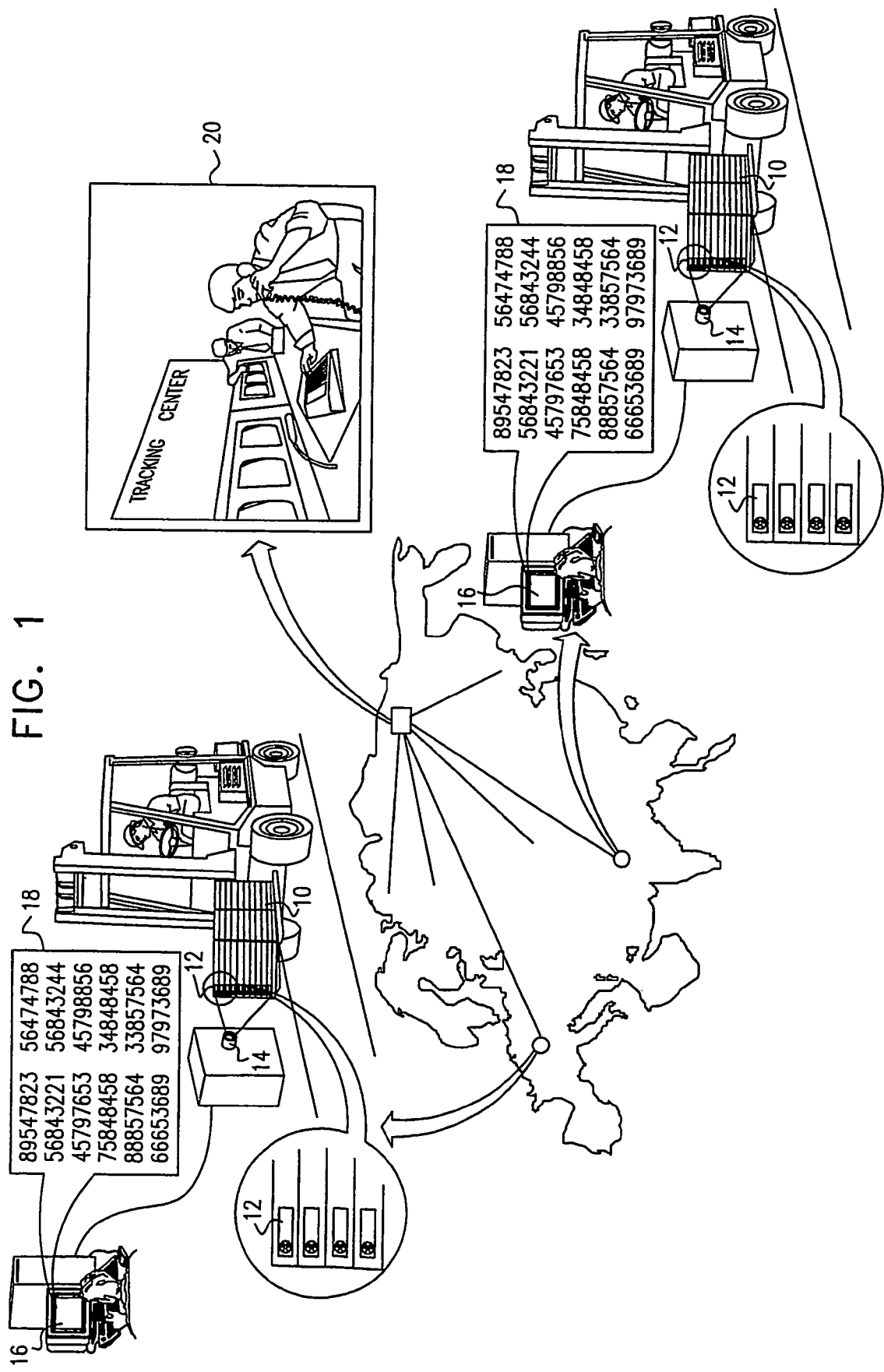
FIG. 1 is a simplified illustration of a multiple location object tracing and tracking system constructed and operative in accordance with a preferred embodiment of the present invention.

Reference is now made to FIG. 1, which is a simplified illustration of a multiple location object tracing and tracking system constructed and operative in accordance with a preferred embodiment of the present invention.

As seen in FIG. 1, there is preferably provided a tracing and tracking system which covers multiple geographically disparate locations at which it is sought to trace and track objects. At typical such locations, such as warehouses, a plurality of objects, such as stacked, collapsed containers 10, each bear an imagable identifier 12. The imagable identifier preferably comprises a multi-segment, multi-color identifier preferably in the form of a multi-segment color-coded disc wherein various segments have various colors. A preferred imagable identifier is commercially available from ImageID Inc. of One Penn Plaza, Suite 2210, New York, N.Y., U.S.A. under the trade name Imagecode. The identifier is described in the following references, the disclosures of which are hereby incorporated by reference:

U.S. patent application Ser. No. 09/508,300, (now abandoned).

Published PCT Patent Application WO 00/04711.

It is a particular feature of the present invention that the imagable identifiers on a plurality of objects may be imaged together, as in a single photograph, by a conventional imager 14, such as a digital camera. This is principally due to the fact that the various colors appear in the imagable identifier in two dimensional areas which are relatively easily differentiated from each other both spatially and in color space.

The image output of the imager is preferably provided to a computer 16, which may process the image output locally and provide an output indication 18 representing a plurality of numerical or alphanumerical identifiers corresponding to all of the imagable identifiers imaged in a given image or series of images. Alternatively or additionally, computer 16 may communicate via any suitable computer network, such as the Internet, with a remote tracking center 20, which may receive either image outputs for processing or alternatively may receive the plurality of numerical or alphanumerical identifiers corresponding to all of the imagable identifiers imaged in a given image or series of images. The image outputs may also be stored for future retrieval, either locally in computer 16 or in remote tracking center 20.

The remote tracking center 20 preferably compiles records of tracked numerical or alphanumerical identifiers from a multiplicity of geographically disparate locations so as to enable ready counting, tracking and locating of objects identified thereby. Remote tracking center 20 preferably maintains a database which is updated based on communications received from various geographically disparate locations.

Figure 2:
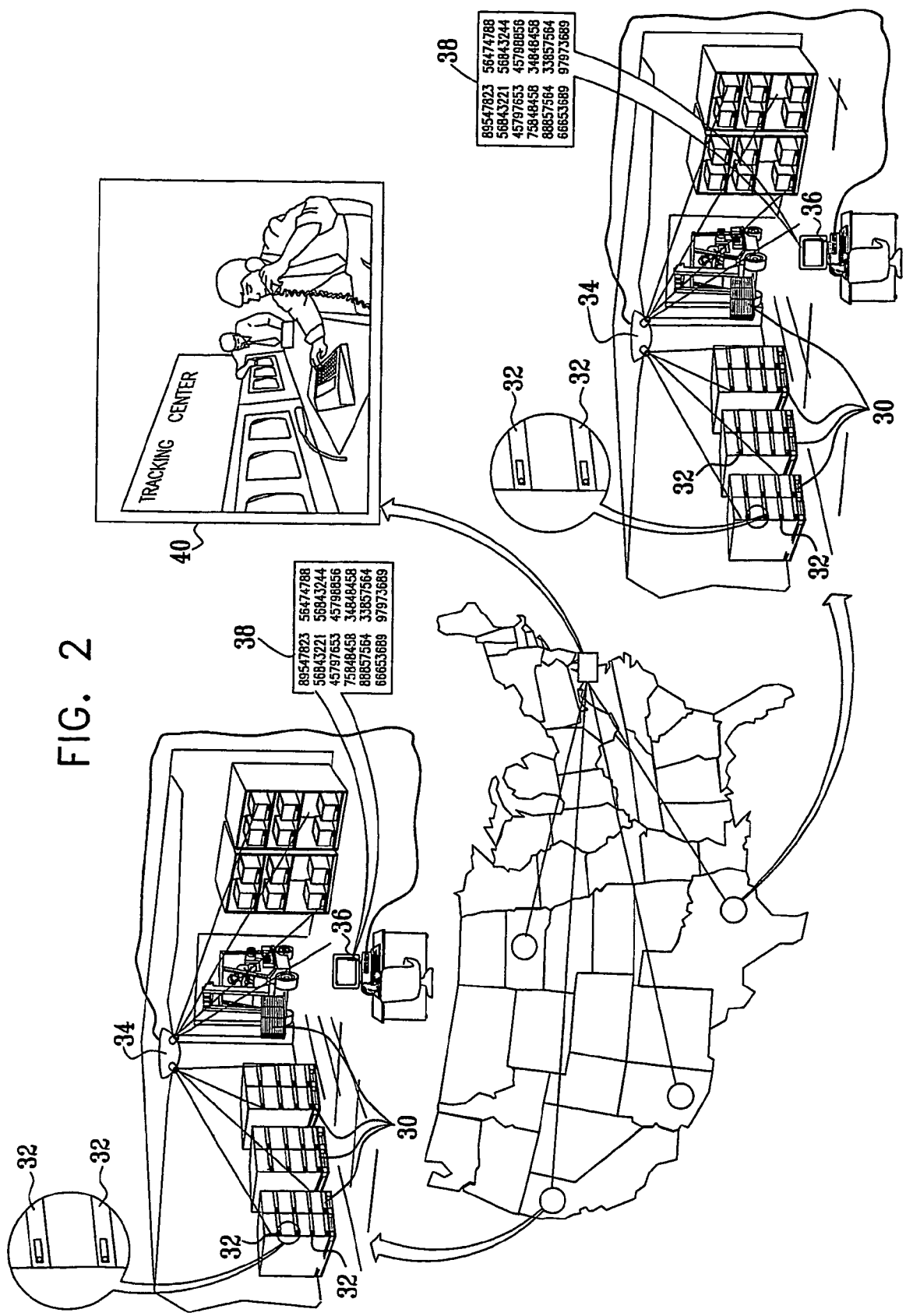
FIG. 2 is a simplified illustration of a multiple location object tracing and tracking system constructed and operative in accordance with another preferred embodiment of the present invention.

Reference is now made to FIG. 2, which is a simplified illustration of a multiple location object tracing and tracking system constructed and operative in accordance with another preferred embodiment of the present invention. As seen in FIG. 2, there is preferably provided a tracing and tracking system which covers multiple geographically disparate locations at which it is sought to trace and track objects. At typical such locations, such as warehouses, a plurality of objects, such as multiple stacks of containers 30 or objects stored on shelves, each bear an imagable identifier 32. The imagable identifier preferably comprises a multi-segment, multi-color identifier preferably in the form of a multi-segment color-coded disc wherein various segments have various colors. A preferred imagable identifier is commercially available from ImageID Inc. of One Penn Plaza, Suite 2210, New York N.Y., U.S.A. under the trade name Imagecode. The identifier is described in the following references, the disclosures of which are hereby incorporated by reference:

U.S. patent application Ser. No. 09/508,300

Published PCT Patent Application WO 00/04711.

It is a particular feature of the present invention that the imagable identifiers on a plurality of objects may be automatically imaged together, as in a single photograph or a series of photographs, by a conventional imager 34, such as a panoramic digital camera. This is principally due to the fact that the various colors appear in the imagable identifier in two dimensional areas which are relatively easily differentiated from each other both spatially and in color space.

The arrangement of FIG. 2 is particularly useful for continuously updating inventory records of a large number of objects automatically, without the necessity of approaching each object or stack of objects or moving the objects past a tracking station.

The image output of the imager is preferably provided to a computer 36, which may process the image output locally and provide an output indication 38 representing a plurality of numerical or alphanumerical identifiers corresponding to all of the imagable identifiers imaged in a given image or series of images. Alternatively or additionally, computer 36 may communicate via any suitable computer network, such as the Internet, with a remote tracking center 40, which may receive either image outputs for processing or alternatively may receive the plurality of numerical or alphanumerical identifiers corresponding to all of the imagable identifiers imaged in a given image or series of images. The image outputs may also be stored for future retrieval, either locally in computer 36 or in remote tracking center 40.

The remote tracking center 40 preferably compiles records of tracked numerical or alphanumerical identifiers from a multiplicity of geographically disparate locations so as to enable ready counting, tracking and locating of objects identified thereby. Remote tracking center 40 preferably maintains a database which is updated based on communications received from various geographically disparate locations.

Figure 3:
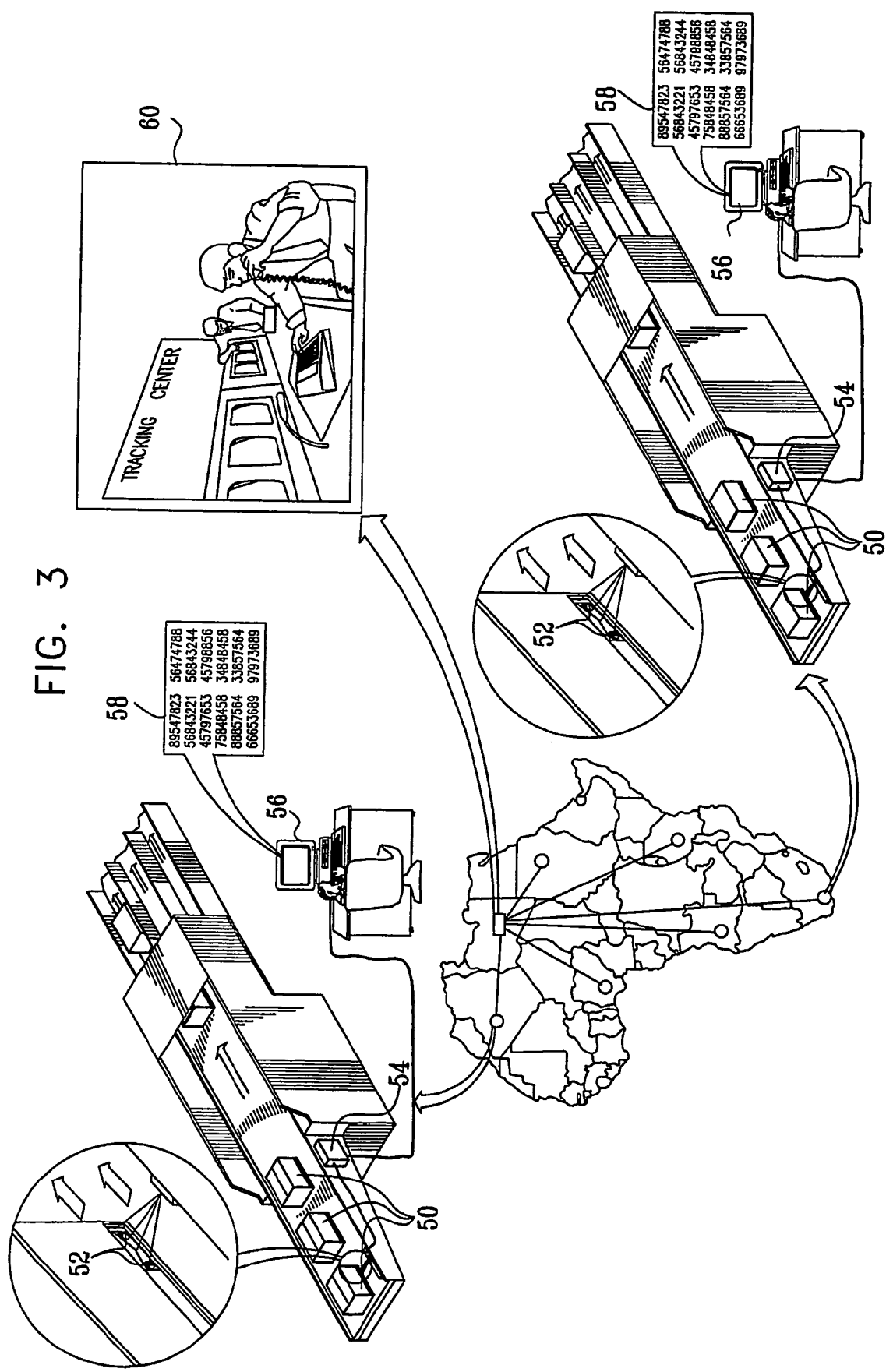
FIG. 3 is a simplified illustration of a multiple location object tracing and tracking system constructed and operative in accordance with yet another preferred embodiment of the present invention.

Reference is now made to FIG. 3, which is a simplified illustration of a multiple location object tracing and tracking system constructed and operative in accordance with yet another preferred embodiment of the present invention. As seen in FIG. 3, there is preferably provided a tracing and tracking system which covers multiple geographically disparate locations at which it is sought to trace and track objects. At typical such locations, such as warehouses, a plurality of objects, such as multiple containers 50, each bear a plurality of imagable identifiers 52. Each imagable identifier preferably comprises a multi-segment, multi-color identifier preferably in the form of a multi-segment color-coded disc wherein various segments have various colors. A preferred imagable identifier is commercially available from ImageID Inc. of One Penn Plaza, Suite 2210, New York N.Y., U.S.A. under the trade name Imagecode. The identifier is described in the following references, the disclosures of which are hereby incorporated by reference:

U.S. patent application Ser. No. 09/508,300
Published PCT Patent Application WO 00/04711.

It is a particular feature of the present invention that multiple imagable identifiers on one or more objects may be automatically imaged together, as in a single photograph or a series of photographs, by a conventional imager 54, such as a digital camera. This is principally due to the fact that the various colors appear in the imagable identifier in two dimensional areas which are relatively easily differentiated from each other both spatially and in color space.

The arrangement of FIG. 3 is particularly useful for providing a relatively large number of available numerical or alphanumerical identifiers. For example, use of a single Imagecode™ imagable identifier typically provides approximately 60,000 combinations. The use of two Imagecode™ imagable identifiers in a predetermined relative spatial orientation may provide approximately 60,000×60,000 combinations.

The image output of the imager is preferably provided to a computer 56, which may process the image output locally and provide an output indication 58 representing a plurality of numerical or alphanumerical identifiers corresponding to all of the pluralities of imagable identifiers imaged in a given image or series of images. Alternatively or additionally, computer 56 may communicate via any suitable computer network, such as the Internet, with a remote tracking center 60, which may receive either image outputs for processing or alternatively may receive the plurality of numerical or alphanumerical identifiers corresponding to all of the imagable identifiers imaged in a given image or series of images. The image outputs may also be stored for future retrieval, either locally in computer 56 or in remote tracking center 60.

The remote tracking center 60 preferably compiles records of tracked numerical or alphanumerical identifiers from a multiplicity of geographically disparate locations so as to enable ready counting, tracking and locating of objects identified thereby. Remote tracking center 60 preferably maintains a database which is updated based on communications received from various geographically disparate locations.

In accordance with a preferred embodiment of the present invention, the multi-segment, multi-color identifier 12, 32 and 52 is capable of identifying and distinguishing a plurality of objects at least equal to approximately:

Plurality of objects=$(n \times (n-1)^{(p-2)} \times (n-2))/p$ where n is the number of different colors and p is the number of segments.

The foregoing calculation does not assume any predetermined orientation of the imagable identifier.

More preferably, the multi-segment, multi-color identifier is capable of identifying and distinguishing a plurality of objects at least equal to approximately:

Plurality of objects=$n \times (n-1)^{(p-2)} \times (n-2)$ where n is the number of different colors and p is the number of segments.

This calculation assumes a known or constant orientation of the imagable identifier.

In accordance with a preferred embodiment of the invention, the multi-segment, multi-color identifier has an inherent orientation. It is appreciated that this need not necessarily be the case. When the multi-segment, multi-color identifier does not have an inherent orientation, the methodology exemplified in FIG. 4 is particularly useful.

Figure 4:
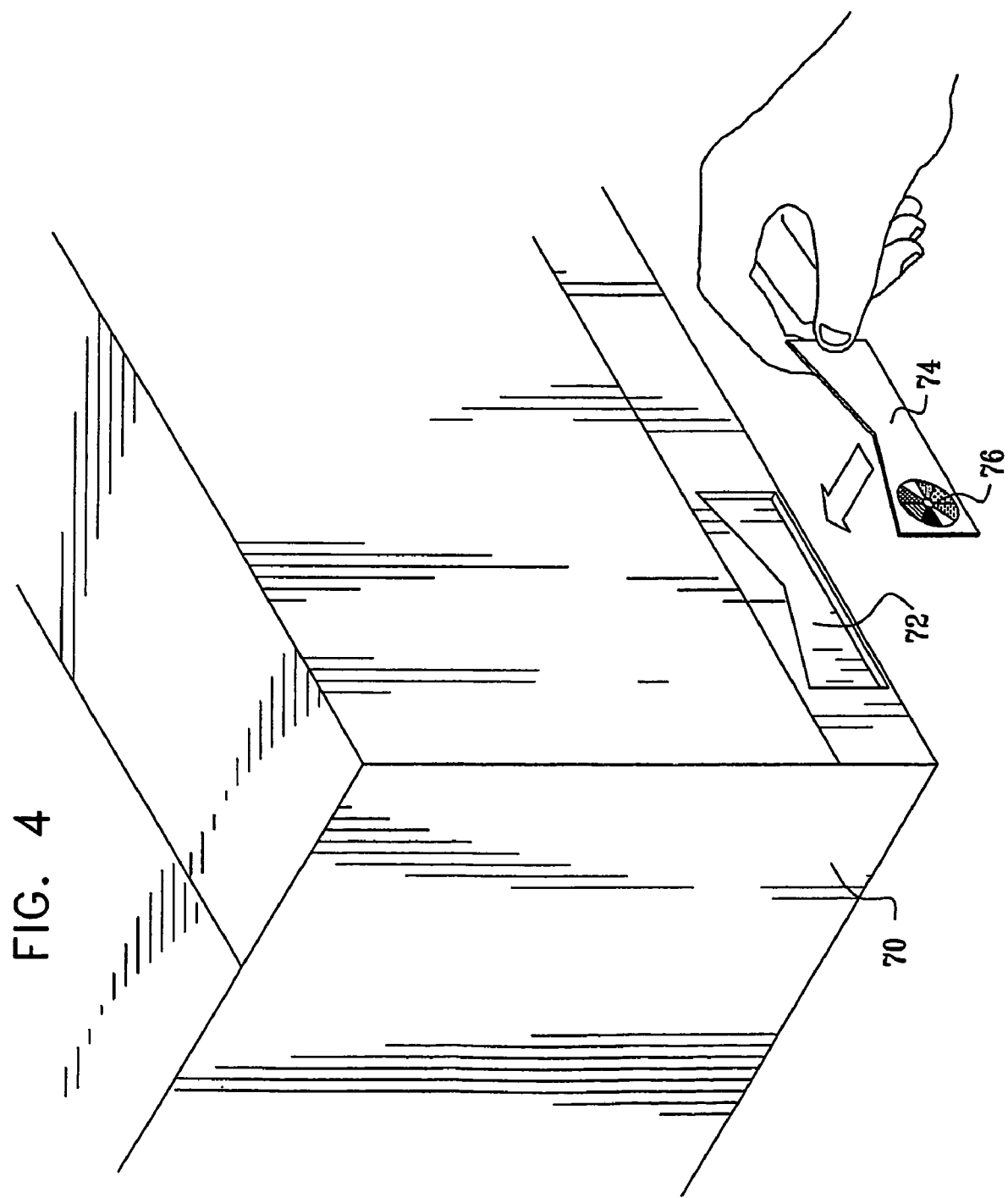
FIG. 4 is an illustration of a methodology for correct affixation of an imagable identifier to an object.

Reference is now made to FIG. 4, which is an illustration of a methodology for correct affixation of an imagable identifier to an object. It is appreciated that due to the circular symmetry of the Imagecode™ imagable identifier, consistency of affixation orientation is important in order to maximize the number of available combinations of numerical or alphanumerical identifiers while avoiding misidentification of objects.

One technique for ensuring correct affixation orientation is to mold or otherwise form onto a container 70, a three-dimensionally defined affixation location 72 and to provide an imagable identifier carrier 74, such as an adhesive backed sticker, which has a configuration, such as a notched configuration, which allows it to be placed in the three-dimensionally defined affixation location 72 only in one unique orientation relative to the container. Clearly, the structure and methodology shown in FIG. 4 is applicable to imagable identifier carriers 74 which bear multiple as well as single imagable identifiers 76. It is appreciated that other suitable techniques of unique orientation affixation may be employed, such as printing or molding of an imagable identifier directly onto an object.

It is noted that for the sake of clarity, the features of FIGS. 1, 2, 3 and 4 have been described separately. It is to be appreciated that the features of any one or all of FIGS. 1, 2, 3 and 4 may be advantageously combined in a given system or methodology.

Figure 5:
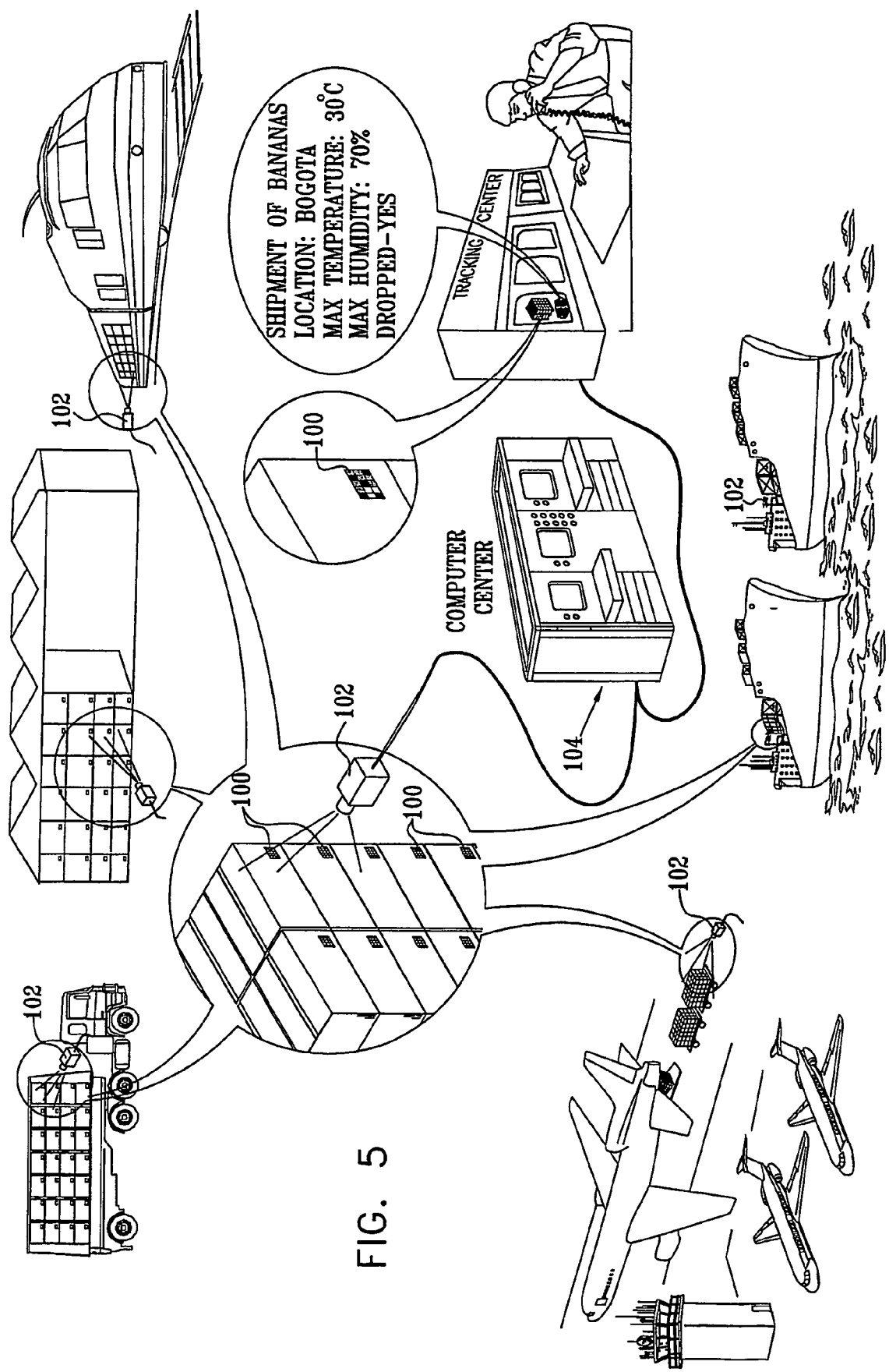
FIG. 5 is a simplified pictorial illustration of a multi-parameter object tracking system and methodology constructed and operative in accordance with another preferred embodiment of the present invention.

Reference is now made to FIG. 5, which is a simplified pictorial illustration of a multi-parameter object tracking system and methodology constructed and operative in accordance with another preferred embodiment of the present invention. As seen in FIG. 5, objects, such as crates of various goods, each bear optically sensible identification indicators 100, preferably comprising multiple colored regions, defining a unique pattern which corresponds to a unique code. The objects are imaged in situ in various locations, such as while loaded on a truck, stored in a warehouse, being hauled on a train, about to be loaded onto an aircraft or onboard a ship. Imaging may be carried out by a conventional, relatively low cost camera 102, such as a color CCD camera.

In accordance with one preferred embodiment of the present invention, the identification indicators 100 are static indicators, such as those shown and described in assignee's Published PCT Application WO 00/04711, the disclosure of which is hereby incorporated by reference. Alternatively or additionally, the identification indicators 100 are dynamic indicators, such as those described hereinbelow with reference to FIGS. 8A-10.

The outputs of camera 102 or multiple cameras 102 are preferably supplied to a computer 104 which analyzes the images produced thereby to extract a code corresponding to the combination of colored regions on each optically sensible identification indicator. As will be described hereinbelow in greater detail, this code may contain object identification information as well as information relevant to various additional parameters relevant to the object. A preferred embodiment of the methodology of decoding the identification indicators is described hereinbelow with respect to FIG. 11.

Preferably, as illustrated in FIG. 5, the identification indicators 100 are imaged or photographed together with the objects which they identify, thus providing the possibility of visual verification of information coded onto the identification indicators 100. In the illustrated embodiment of FIG. 5, the identification indicator 100 not only identifies the object but also indicates its present contents, the maximum temperature and humidity to which it has been exposed and whether it has been dropped.

It is appreciated that a suitable device (not shown) for the generation of identification indicators 100 is preferably provided as part of the multi-parameter object tracking system. In accordance with one embodiment of the present invention, static identification indicators 100 may be generated by any suitable printing device equipped with encoding software, so that an operator could print an encoded identification indicator by selecting the applicable parameters, such as from a menu of available parameters or by any other suitable method. In another preferred embodiment, dynamic identification indicators 100 may be generated as described hereinbelow with reference to FIG. 10.

Additionally, the identification indicator 100 may be used in conjunction with an electronic article surveillance (EAS) device or a radio frequency identification device (RFID). In this embodiment, the visually sensible identification indicator 100 preferably contains an indication that the item has an EAS or RFID device and may also indicate the type of the device. Such a combination of identification indicator and EAS/RFID device may also be used to control asset flow, where the EAS device will indicate that an item is leaving a location which will require the operator to utilize a camera, such as camera 102, to image the visually sensible identification indicator 100. Suitable EAS and RFID devices are manufactured by HID Corporation, 9292 Jeronimo Road, Irvine, Calif. 92618 USA or Sensormatic, 6600 Congress Ave., P.O. Box 310700, Boca Raton, Fla. 33431-0700 USA.

Figure 6B:
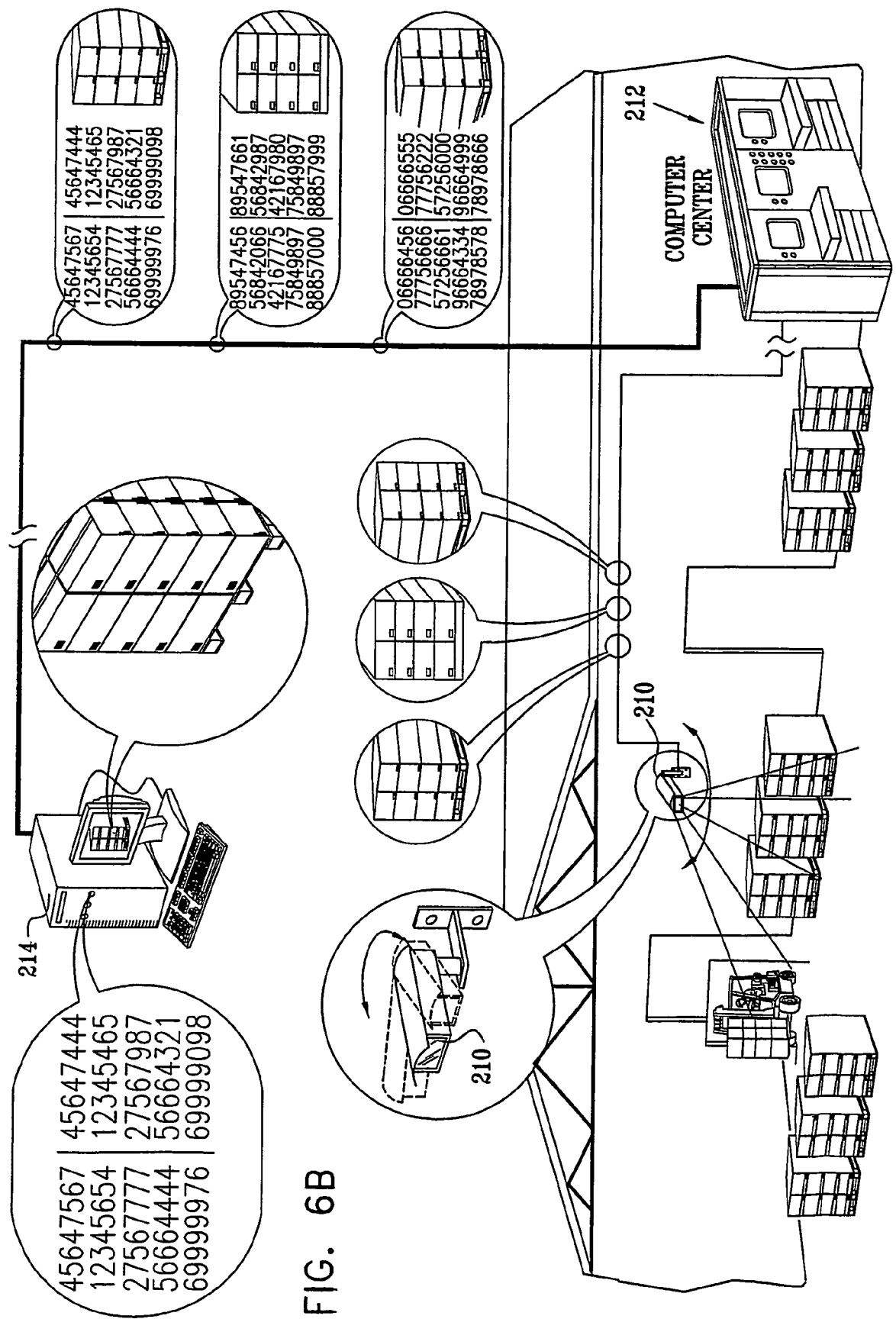

Reference is now made to FIGS. 6A, 6B, 6C and 6D, which are simplified pictorial illustrations of four features which are preferably included in the system of FIG. 5. FIG. 6A illustrates multiple fixed position imagers 200, such as CCD cameras, each providing an imagewise output to a common computer 202, which analyzes the images output from imagers 200, extracts and decodes the identification indicators and provides coded identification outputs together with the images captured by the imagers 200 to a remote computer 204.

FIG. 6B illustrates the use of a variable orientation imager 210 to scan a given region and provide at different times, images of different objects. As in the embodiment of FIG. 6A, a common computer 212 analyzes the images output from imager 210, extracts and decodes the identification indicators and provides coded identification outputs together with the images captured by the imager 210 to a remote computer 214.

Figure 6C:
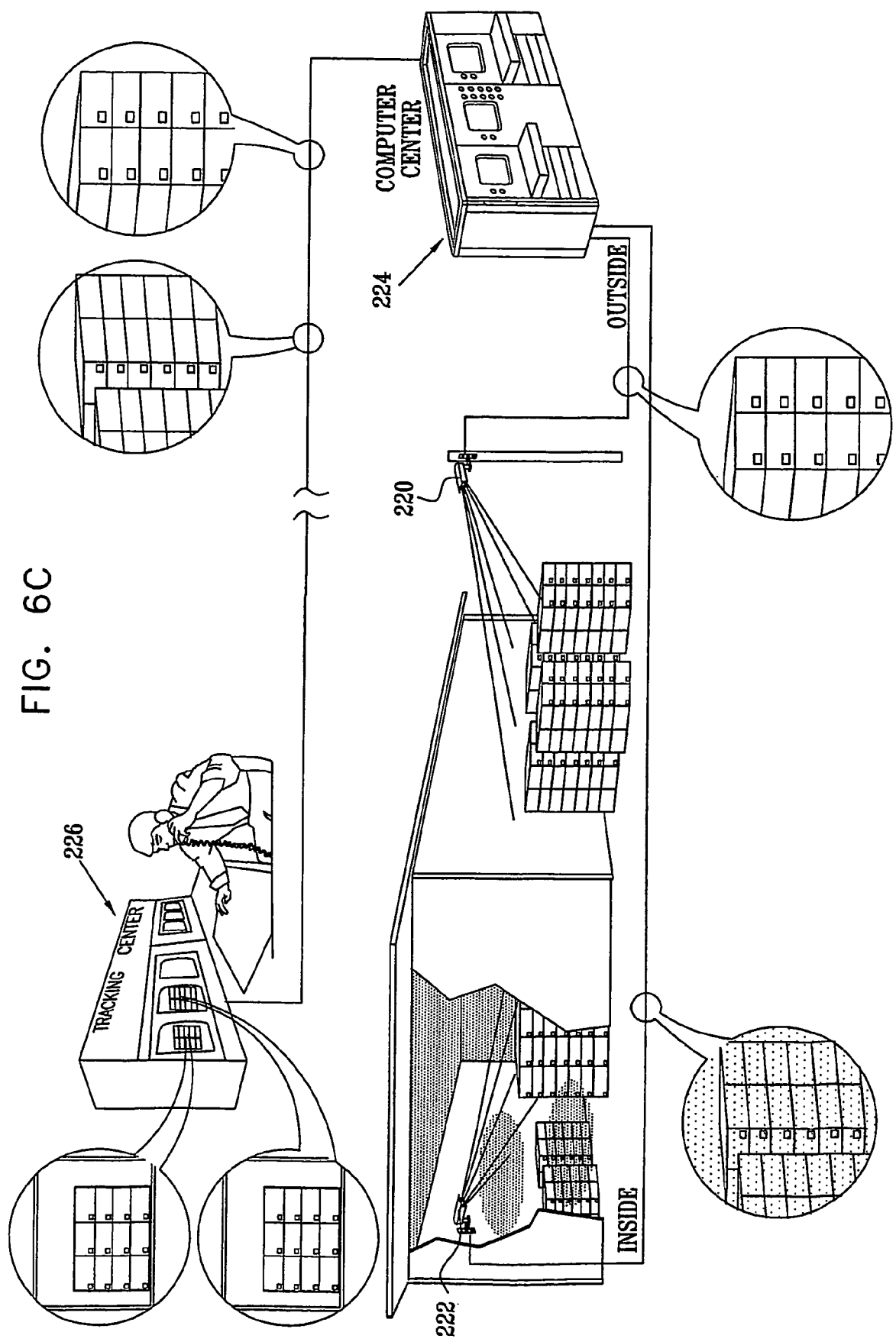

FIG. 6C illustrates the use of variable orientation imagers 220 and 222 in respectively high and low illumination environments to provide images of the objects under differing levels of illumination. As in the embodiment of FIGS. 6A and 6B, a common computer 224, analyzes the images output from imagers 220 and 222, normalizes the images for illumination, extracts and decodes the identification indicators and provides coded identification outputs together with the images captured by the imagers 220 and 222 to a remote computer 226.

Figure 6D:
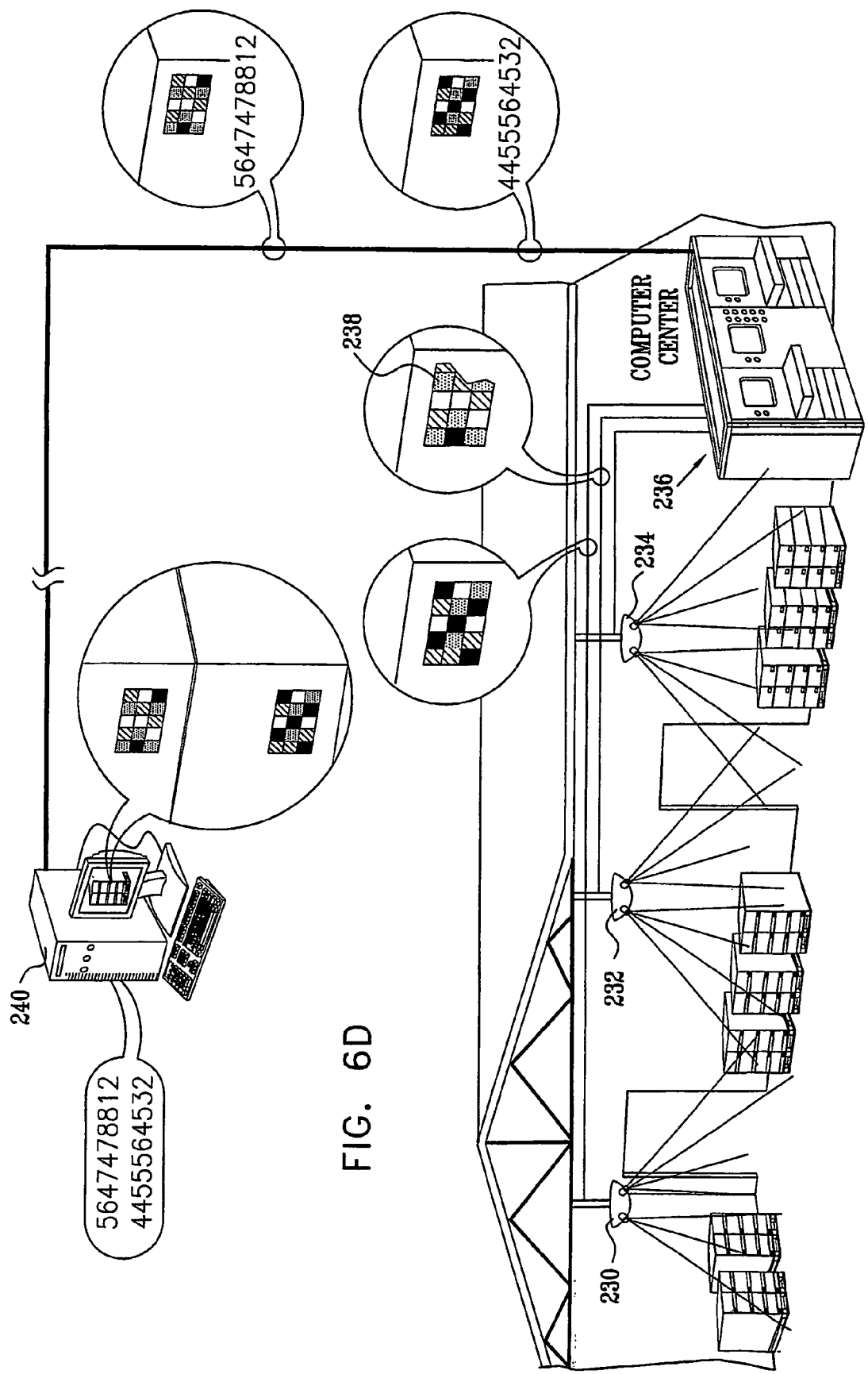

FIG. 6D illustrates the use of imagers 230, 232 and 234 to provide images of the objects. As in the embodiment of FIGS. 6A-6C, a common computer 236, analyzes the images output from imagers 230-234, fills in information missing from a damaged identification indicator, here designated by reference numeral 238, using one or more mathematical error correction algorithms, extracts and decodes the identification indicators and provides coded identification outputs together with corrected images captured by the imagers 230-234 to a remote computer 240. Suitable mathematical error correction algorithms, such as BCH coding or Reed-Solomon codes, are well known in the art and are described in *The Theory of Error-correcting Codes*, by F. J. Macwilliams and N. Sloane, 1977, North-Holland Publishers.

Figure 7:
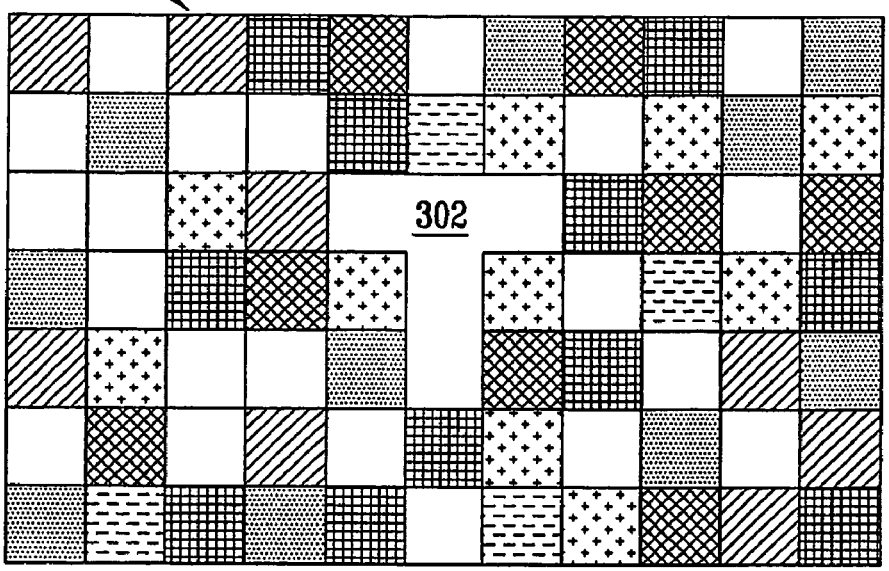
FIG. 7 is a simplified illustration of an identification indicator including a location and orientation locator, useful in the system and methodology of FIG. 5.

Reference is now made to FIG. 7, which is a simplified illustration of an identification indicator 300 including a location and orientation locator 302, here in the shape of a T, useful in the system and methodology of FIG. 5. It is seen that the identification indicator 300 has a pattern which includes a relatively large number of colored pixels, here 72 in number.

Figure 8A:
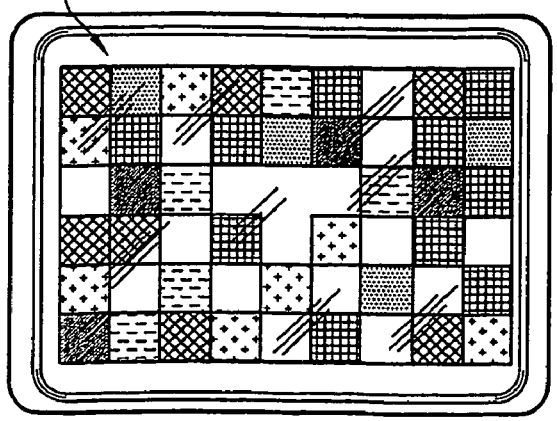
FIGS. 8A and 8B are simplified illustrations of an identification indicator embodied in an electronic display, such as a liquid crystal display, useful in the system and methodology of FIG. 5.
Figure 8B:
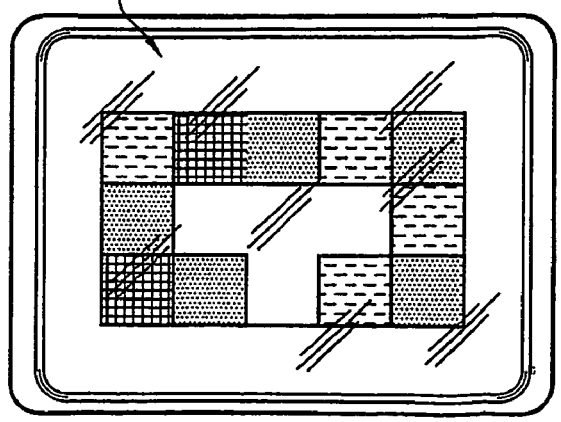

Reference is now made to FIGS. 8A and 8B, which are simplified illustrations of an identification indicator embodied in a dynamic electronic display, such as a liquid crystal display, useful in the system and methodology of FIG. 5. The identification indicator 400 in the embodiment of FIGS. 8A and 8B is distinguished from that shown in FIG. 7 in that it is dynamic, and can be changed over time in order to provide a visually sensible output indication of changing parameters. It may be appreciated by comparing FIGS. 8A and 8B that the identification indicator 400 may provide differing resolutions over time and different configurations of identification indicators as well as indications of different parameters.

Figure 9:
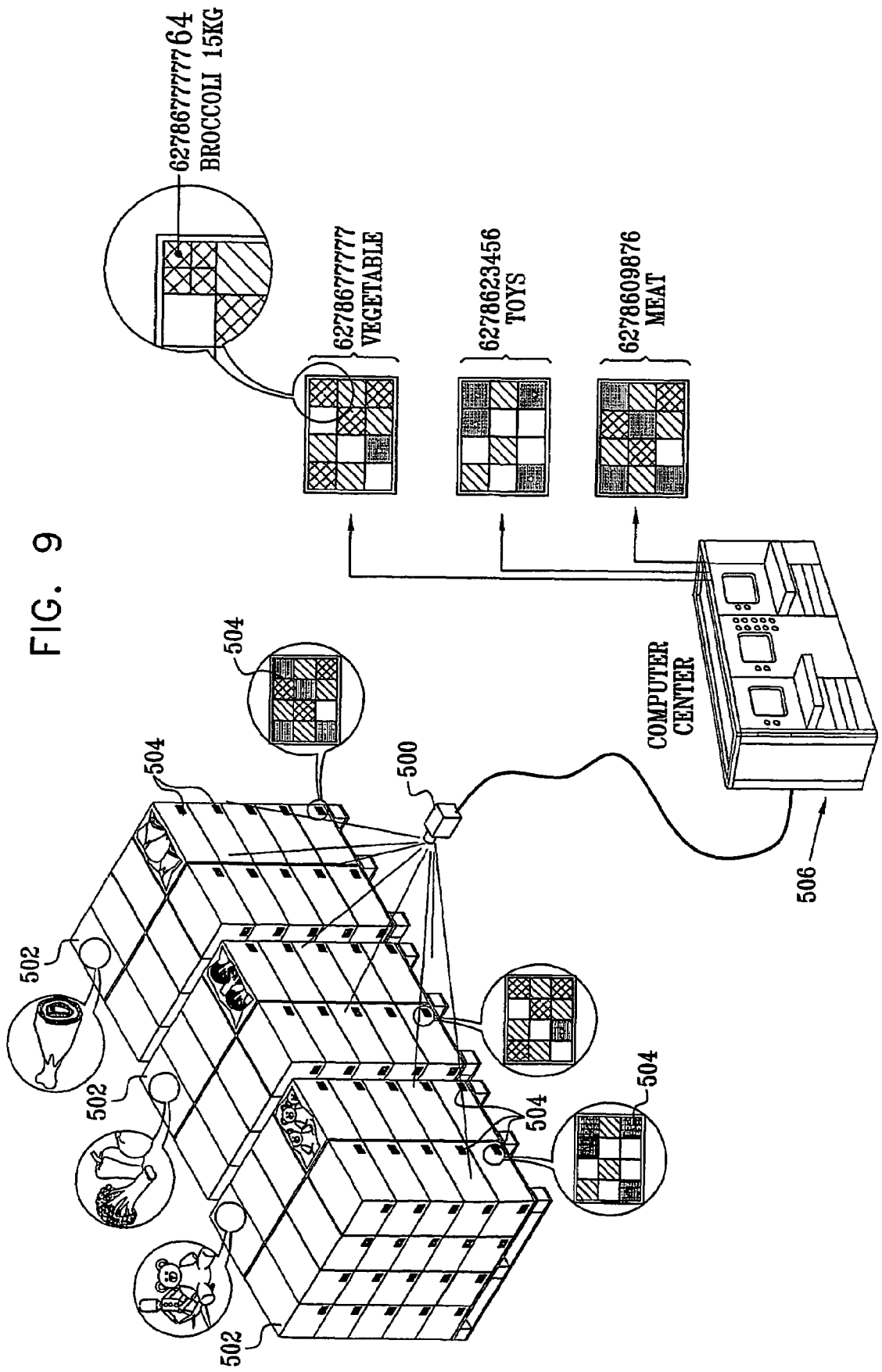
FIG. 9 is a simplified illustration of the use of identification indicators having subpixel resolution in the system and methodology of FIG. 5.

Reference is now made to FIG. 9, which is a simplified illustration of the use of identification indicators having subpixel resolution in the system and methodology of FIG. 5. As seen in FIG. 9, an imager 500 images a multiplicity of objects 502, each of which bears and information indicator 504. The image outputs of the imager 500 may be analyzed by computer 506 at differing resolutions. At a first resolution, a first level of information may be provided, such as in this case, the identification of the crate and the general classification of its contents. At a second resolution, an additional level of information may be obtained from the identification indicators, such as, for example, the specific product contained and its weight.

Figure 10:
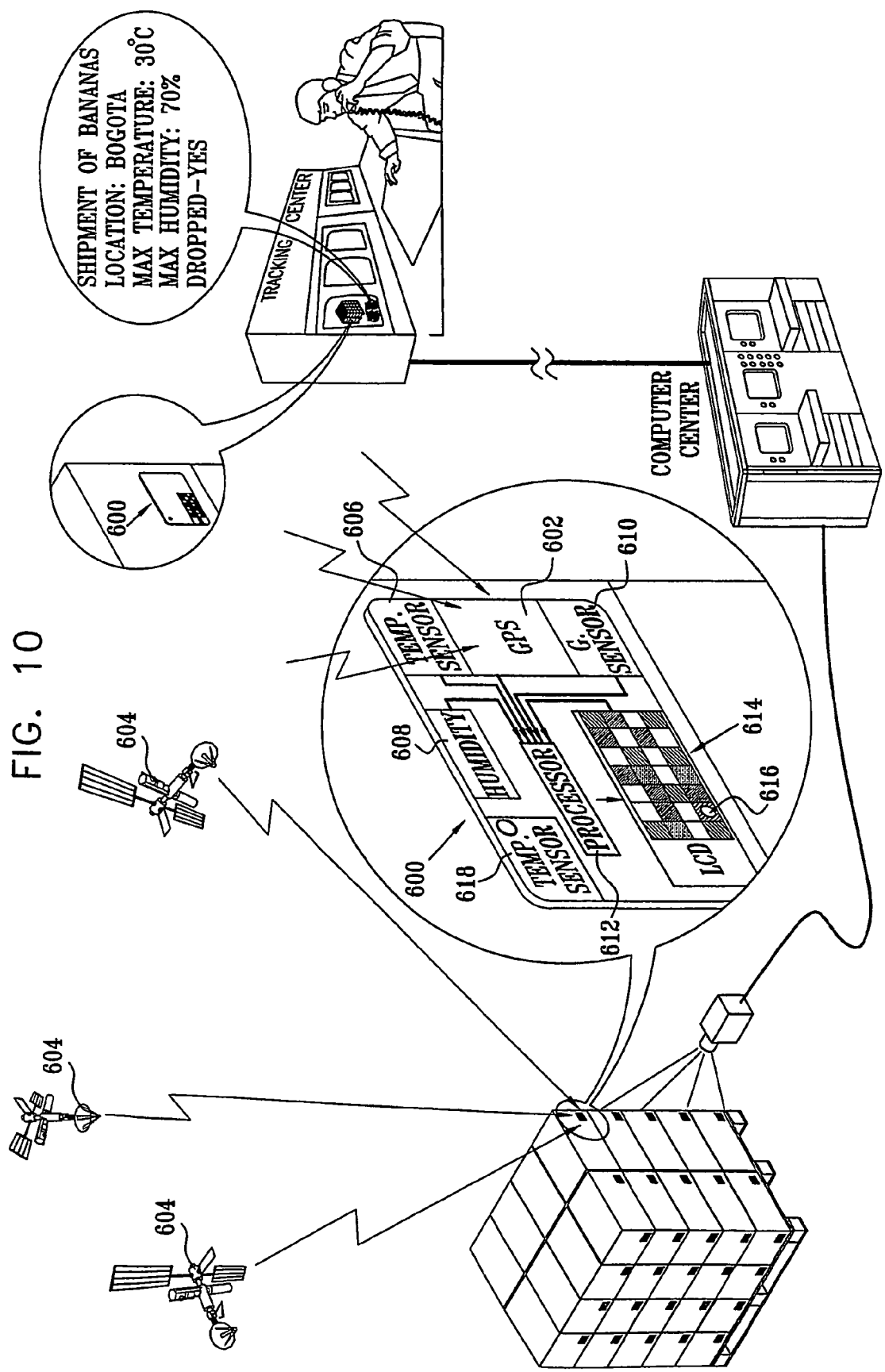
FIG. 10 is a simplified illustration of the use of dynamic visually sensible multi-parameter identification indicators in the system and methodology of FIG. 5.

Reference is now made to FIG. 10, which is a simplified illustration of the use of dynamic visually sensible multi-parameter identification indicators in the system and methodology of FIG. 5. As seen in FIG. 10, a multi-parameter sensor assembly 600 may be provided, including a location sensor 602, such as a GPS sensor, which senses location based on receipt of transmissions from satellites 604, a temperature sensor 606, a humidity sensor 608 and an inertial sensor 610, all of which preferably output to a processor 612, which preferably stores extreme values of the various parameters and displays them in suitably coded form on a dynamic identification indicator, such as an LCD display 614. Sensors 602, 606, 608 and 610 need not generate a visually sensible output, since processor 612 generates visually sensible output based on the inputs received from these sensors. Multi-parameter sensor assembly 600 may also include additional sensors which generate visually sensible output and may or may not be connected to processor 612, such as a visually sensible output sensor 616 located within the imaged area of LCD display 614 or a visually sensible output sensor 618, located within the imaged area of multi-parameter sensor assembly 600.

It is appreciated that processor 612 is preferably also operable to receive additional input parameters, by any suitable method, such as a wired or wireless input device, which are also encoded as part of LCD display 614.

Visually sensible output sensors 616 and 618 may include, but are not limited to, the following environmental sensors:

TILTWATCH tilt indicator and SHOCKWATCH shock indicator, commercially available from Switched On I & T Services of Braeside, Victoria, Australia;

Humidity Indicator Cards and Plugs commercially available from Sud-Chemie Performance Packaging—the Americas Rio Grande Industrial Park 101 Christine Drive, Beten, N.Mex. 87002 USA;

COLDMARK and WARMMARK temperature history indicators, commercially available from IntroTech BV, P.O. Box 3, NL-7370 AA Loenen, the Netherlands.

It is appreciated that sensors 602, 606, 608 and 610 may also be selected from the above list or may be any other suitable sensor.

It is appreciated that while processor 612 is preferably operative to change LCD display 614 in real time, processor 612 may alternatively be operative to change LCD display 614 on a periodic basis, not necessarily in real time.

Figure 11:
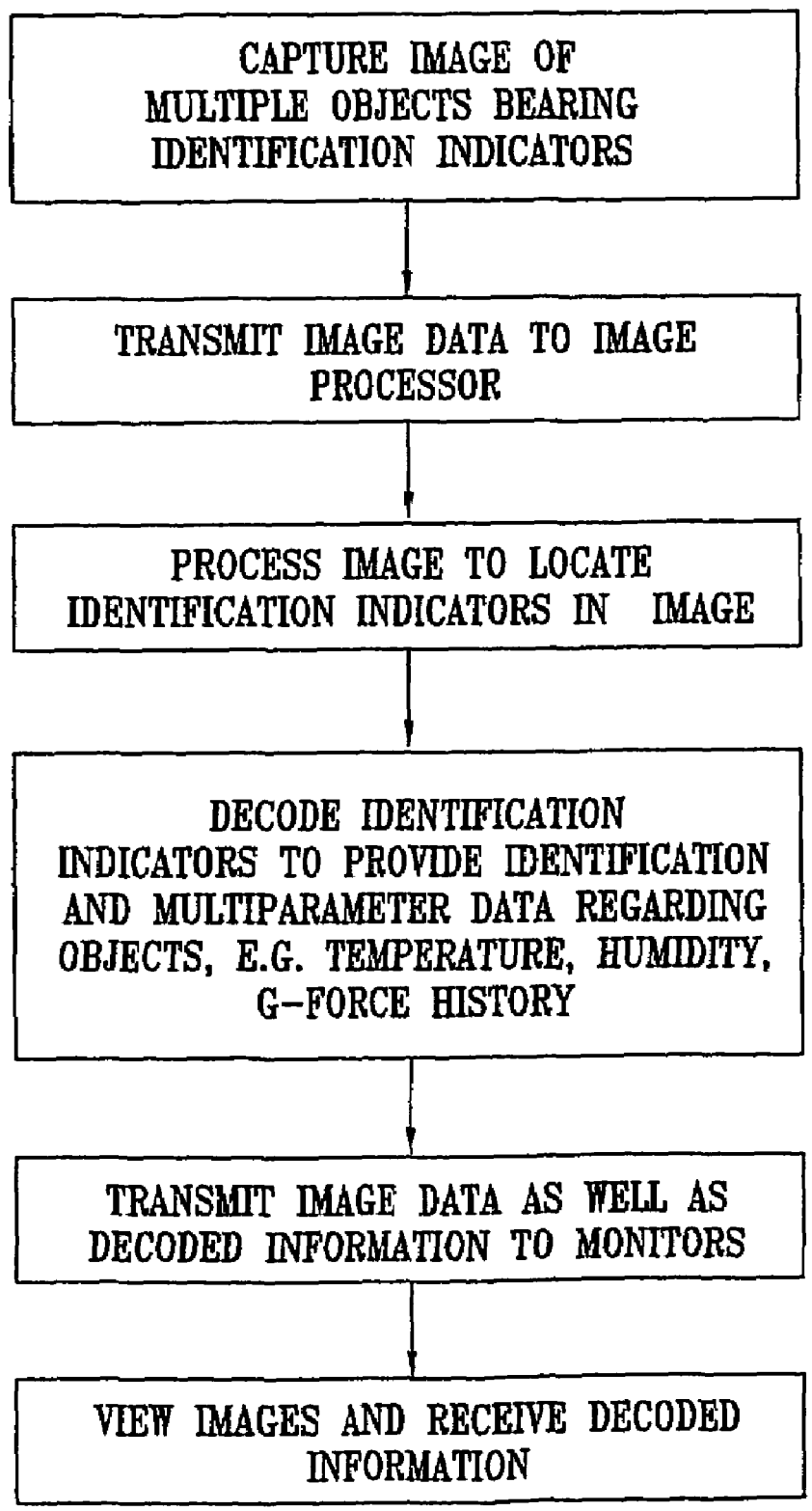
FIG. 11 is a simplified flow chart illustrating a preferred mode of operation of the system of FIG. 5.

Reference is now made to FIG. 11, which is a simplified flow chart illustrating a preferred mode of operation of the system of FIG. 5. As seen in FIG. 11, images of objects, which typically include multiple objects, each bearing an identification indicator, are captured, preferably by a conventional camera, such as a color CCD camera. Preferably, the identification indicators include visually sensible identification information. Additionally, the identification indicators may be dynamic indicators and may provide indication as to various additional parameters relevant to the objects, such as temperature, humidity, tilt and G-shock histories. Visual indications as to other types of parameters may also be provided.

The camera outputs from one or multiple cameras are transmitted wirelessly or via a wired network to a central image processor which processes the images, inter alia to locate and decode the identification indicators in order to extract identification and parameter data. This data, preferably together with the original images showing not only the identification indicators, but also the objects, may be transmitted to one or more monitors, which provide a display of the images and of the decoded data.

It is appreciated that the system and method of the present invention enables real time or non-real time monitoring of objects and multiple locations which may be remote from the monitor and from the image processor.

It will be appreciated by persons skilled in the art that the present invention is not limited to what has been particularly described hereinabove. Rather the scope of the present invention includes both combinations and subcombinations of the various embodiments described hereinabove as well as modifications and additions thereto which would occur naturally to a person of skill in the art upon reading the foregoing description and which are not in the prior art.

The invention claimed is:

1. A method for monitoring objects comprising: imaging together a plurality of objects to be monitored to provide an at least partial image of said plurality of said objects, each of said plurality of objects having at least one dynamic identifier affixed thereto, each of said dynamic identifiers comprising coded indications of at least the identity of said object and a variable parameter relating to said object; and processing said at least partial image to provide said coded indications relating to said identity of at least one of said plurality of objects and said variable parameter relating thereto.

2. The method as in claim 1 wherein said at least one dynamic identifier changes its visual display in real time in accordance with said variable parameter.

3. The method as in claim 2 wherein said variable parameter comprises the environment history of said object.

4. The method as in claim 3 wherein said variable parameter comprises the location of said object.

5. The method as in claim 4 further comprising generating a tracking indication based on the identity and location of said object.

6. The method as in claim 5 further comprising storing said tracking indication.

7. The method as in claim 5 further comprising communicating to a remote location at least one of said tracking indication and said at least partial image.

8. The method as in claim 3 wherein the environment history of said object comprises at least one of the following: object maximum temperature history, object maximum humidity history, object minimum temperature history, object minimum humidity history, object tilt history and object G-force history.

9. An object monitoring system comprising:

an imager for imaging together a plurality of objects to be monitored to provide an at least partial image of said plurality of said objects, each of said plurality of objects having at least one dynamic identifier affixed thereto, each of said dynamic identifiers comprising coded indications of at least the identity of said object and a variable parameter relating to said object; and a processor coupled to said imager and configured to process said at least partial image to provide said coded indications relating to said identity of at least one of said plurality of objects and said variable parameter relating thereto.

10. The system as in claim 9 wherein said imager is a color imager.

11. The system as in claim 9 wherein said at least one dynamic identifier changes its visual display in real time in accordance with said variable parameter.

12. The system as in claim 9 wherein said variable parameter comprises the environment history of said object.

13. The system as in claim 12 wherein said variable parameter comprises the location of said object.

14. The system as in claim 13 wherein said processor is further configured to generate a tracking indication based on the identity and location of said object.

15. The system as in claim 14 wherein said processor is further configured to store said tracking indication.

16. The system as in claim 14 wherein said processor is further configured to communicate to a remote location at least one of said tracking indication and said at least partial image.

17. The system as in claim 12 wherein said object environment history comprises at least one of the following parameters: object maximum temperature history; object maximum humidity history; object minimum temperature history; object minimum humidity history; object tilt history and object G-force history.

18. The system as in claim 9 wherein said imager comprises a first plurality of imaging units and said processor comprises a second plurality of processing units, wherein said first plurality is greater than said second plurality.

19. The system as in claim 9 wherein said imager comprises at least one scanning imager.

20. The system as in claim 9 wherein said processor is further configured to process images captured at plural locations.

21. A system for monitoring objects having a plurality of sensors associated therewith and visually sensible indicators associated with each of said objects, the indicators receiving sensor outputs of said plurality of sensors and providing visually sensible indications of said sensor outputs, the system comprising:
- at least one imager to capture images of said visually sensible indicators; and
- at least one image processor to receive image outputs of said at least one imager and to extract from said image outputs coded information indicated by said visually sensible indicators.

22. The system as in claim 21 further comprising at least one display device receiving and displaying said coded information from said image processor.

23. The system as in claim 22 wherein said at least one display device is remotely located from said objects.

24. The system as in claim 21 wherein said coded information comprises at least the identity of said object and a variable parameter relating to said object.

25. The system as in claim 24 wherein said variable parameter comprises the environment history of said object.

26. The system as in claim 25 wherein said variable parameter comprises the location of said object.

27. The system as in claim 25 wherein said environment history of the object comprises at least one of the following: object maximum temperature history; object maximum humidity history; object minimum temperature history; object minimum humidity history; object tilt history and object G-force history.

28. The system as in claim 21 wherein said at least one imager comprises a plurality of imagers, which plurality is greater than the number of said at least one image processor.

29. The system as in claim 21 wherein said at least one imager comprises at least one scanning imager.

30. A method comprising:
- providing a plurality of sensors being associated with objects being monitored;
- providing visually sensible indicators associated with each of said objects;
- providing sensor outputs of said plurality of sensors to said visually sensible indicators;
- operating said visually sensible indicators to provide visually sensible indications of said sensor outputs;
- providing at least one imager to capture images of said visually sensible indicators; and
- providing at least one image processor to receive image outputs of said at least one imager and extract from said image outputs coded information indicated by said visually sensible indicators.

31. The method as in claim 30 further comprising remotely receiving and displaying at least one of said coded information and said images of said objects.

32. The method as in claim 30 wherein said coded information comprises at least the identity of said abject and a variable parameter relating to said object.

33. The method as in claim 32 wherein said variable parameter comprises the environment history of said object.

34. The method as in claim 33 wherein said variable parameter comprises the location of said object.

35. The method as in claim 34 wherein the environment history of said object includes at least one of the following: object maximum temperature history, object maximum humidity history; object minimum temperature history; object minimum humidity history; object tilt history and object G-force history.

36. The method as in claim 30 further comprising processing images captured at plural locations.

37. A visually sensible indicator mountable on an object, the indicator comprising:
- a coded indication of object identification;
- a coded indication of object location; and
- a coded indication of object environment history.

38. The indicator as in claim 37 wherein said object environment history is at least one of the following: object maximum temperature history, object maximum humidity history, object minimum temperature history, object minimum humidity history, object tilt history and object G-force history.

* * * * *